United States Patent
Buer

(10) Patent No.: US 8,799,678 B2
(45) Date of Patent: *Aug. 5, 2014

(54) SYSTEM AND METHOD FOR SECURING EXECUTABLE CODE

(75) Inventor: Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/791,619

(22) Filed: Jun. 1, 2010

(65) Prior Publication Data

US 2010/0241841 A1    Sep. 23, 2010

Related U.S. Application Data

(63) Continuation of application No. 10/879,349, filed on Jun. 30, 2004, now Pat. No. 7,734,932.

(60) Provisional application No. 60/518,323, filed on Nov. 10, 2003.

(51) Int. Cl.
 *G06F 21/00* (2013.01)
 *H04L 9/12* (2006.01)
 *G06F 21/72* (2013.01)
 *G06F 21/51* (2013.01)

(52) U.S. Cl.
 CPC ............ *G06F 21/72* (2013.01); *G06F 21/51* (2013.01)
 USPC .......................................... 713/190; 380/262

(58) Field of Classification Search
 USPC .................. 713/189, 190, 193; 711/163, 164
 See application file for complete search history.

(56) References Cited

U.S. PATENT DOCUMENTS

| | | | |
|---|---|---|---|
| 4,558,176 A | | 12/1985 | Arnold et al. |
| 5,359,659 A | | 10/1994 | Rosenthal |
| 5,666,411 A | | 9/1997 | McCarty |
| 5,940,513 A | * | 8/1999 | Aucsmith et al. ............. 713/187 |
| 5,943,421 A | | 8/1999 | Grabon |

(Continued)

FOREIGN PATENT DOCUMENTS

| | | |
|---|---|---|
| CN | 1302404 A | 7/2001 |
| EP | 0 583 140 A1 | 2/1994 |
| EP | 1 085 420 A1 | 3/2001 |
| EP | 1 273 996 A2 | 1/2003 |

OTHER PUBLICATIONS

Partial European Search Report, from European Patent Appl. No. 04026195.0, dated Nov. 22, 2005, 5 pages.

(Continued)

*Primary Examiner* — Gilberto Barron, Jr.
*Assistant Examiner* — Abdulhakim Nobahar
(74) *Attorney, Agent, or Firm* — Sterne, Kessler, Goldstein & Fox P.L.L.C.

(57) ABSTRACT

A system and method for the secure storage of executable code and the secure movement of such code from memory to a processor. The method includes the storage of an encrypted version of the code. The code is then decrypted and decompressed as necessary, before re-encryption in storage. The re-encrypted executable code is then written to external memory. As a cache line of executable code is required, a fetch is performed but intercepted. In the interception, the cache line is decrypted. The plain text cache line is then stored in an instruction cache associated with a processor.

19 Claims, 10 Drawing Sheets

(56) References Cited

U.S. PATENT DOCUMENTS

| | | | |
|---|---|---|---|
| 6,141,698 A * | 10/2000 | Krishnan et al. | 719/331 |
| 6,523,118 B1 | 2/2003 | Buer | |
| 6,834,346 B1 | 12/2004 | Ishibashi et al. | |
| 6,910,094 B1 | 6/2005 | Eslinger et al. | |
| 6,970,565 B1 | 11/2005 | Rindsberg | |
| 7,055,039 B2 * | 5/2006 | Chavanne et al. | 713/193 |
| 7,266,842 B2 * | 9/2007 | Foster et al. | 726/17 |
| 7,321,910 B2 * | 1/2008 | Crispin et al. | 708/231 |
| 7,472,285 B2 * | 12/2008 | Graunke et al. | 713/193 |
| 7,509,639 B2 * | 3/2009 | Worley, Jr. | 718/1 |
| 7,761,717 B2 * | 7/2010 | Moller et al. | 713/189 |
| 2002/0038428 A1 * | 3/2002 | Safa | 713/187 |
| 2002/0073316 A1 | 6/2002 | Collins et al. | |
| 2002/0112158 A1 | 8/2002 | Golchikov | |
| 2002/0129244 A1 | 9/2002 | DaCosta | |
| 2003/0005282 A1 * | 1/2003 | Bade | 713/151 |
| 2003/0046563 A1 | 3/2003 | Ma et al. | |
| 2004/0177260 A1 | 9/2004 | Gilfix et al. | |
| 2005/0075998 A1 * | 4/2005 | Huang et al. | 707/1 |
| 2005/0100163 A1 | 5/2005 | Buer | |

OTHER PUBLICATIONS

European Search Report, from European Patent Appl. No. 04026195.0, dated Apr. 13, 2006, 6 pages.

* cited by examiner

SYSTEM AND METHOD FOR SECURING EXECUTABLE CODE

CROSS-REFERENCE TO RELATED APPLICATIONS

This application is a Continuation of co-pending U.S. application Ser. No. 10/879,349 filed on Jun. 30, 2004 by BUER, Mark, entitled "SYSTEM AND METHOD FOR SECURING EXECUTABLE CODE," which claims the benefit of U.S. Provisional Application No. 60/518,323, filed on Nov. 10, 2003, entitled "SYSTEM AND METHOD FOR SECURING EXECUTABLE CODE," each of which is incorporated by reference herein in its entirety.

BACKGROUND OF THE INVENTION

1. Field of the Invention

The invention described herein relates to information security, and more particularly to secure processing.

2. Related Art

Secure processing in a computing platform is a well known generic problem. In particular any unintended or undesired alteration of executable code can have dire operational consequences. For example, malicious code (e.g., a Trojan horse) can be inserted to executable code to cause the processor to perform actions that are undesirable and/or unpredictable. Alternatively, instructions can be permuted by a hostile party, so that operations are performed by the processor out of order. Again, the consequences can be undesirable. Other threats may not be malicious. A hardware failure in memory, for example, may serve to alter the executable code. Clearly, this effects the operation of the processor and its results.

In addition, security may an issue with respect to the programmed logic itself. The executable code itself may represent information that must be maintained as a secret. Revealing the executable code could represent a undesirable compromise of sensitive data. In general, executable code can be vulnerable in storage, as well as in transit between memory and a processor or its cache.

In light of such known threats and vulnerabilities, a system and method is needed that protects against the above scenarios, such that the processor performs only the intended operations and the confidentiality of its program is maintained.

SUMMARY OF THE INVENTION

The invention described herein provides for the secure storage of executable code and the secure movement of such code from memory to a processor. The invention includes the storage of an encrypted version of the code. The code is then decrypted and decompressed as necessary, before re-encryption in storage (e.g., in flash memory). The re-encrypted executable code is then written to external memory. As a cache line of executable code is required, a fetch is performed but intercepted. In the interception process, the cache line is decrypted. The resulting plain text cache line is then stored in an instruction cache associated with a processor.

BRIEF DESCRIPTION OF THE DRAWINGS/FIGURES

DETAILED DESCRIPTION OF THE INVENTION

Figure 1:
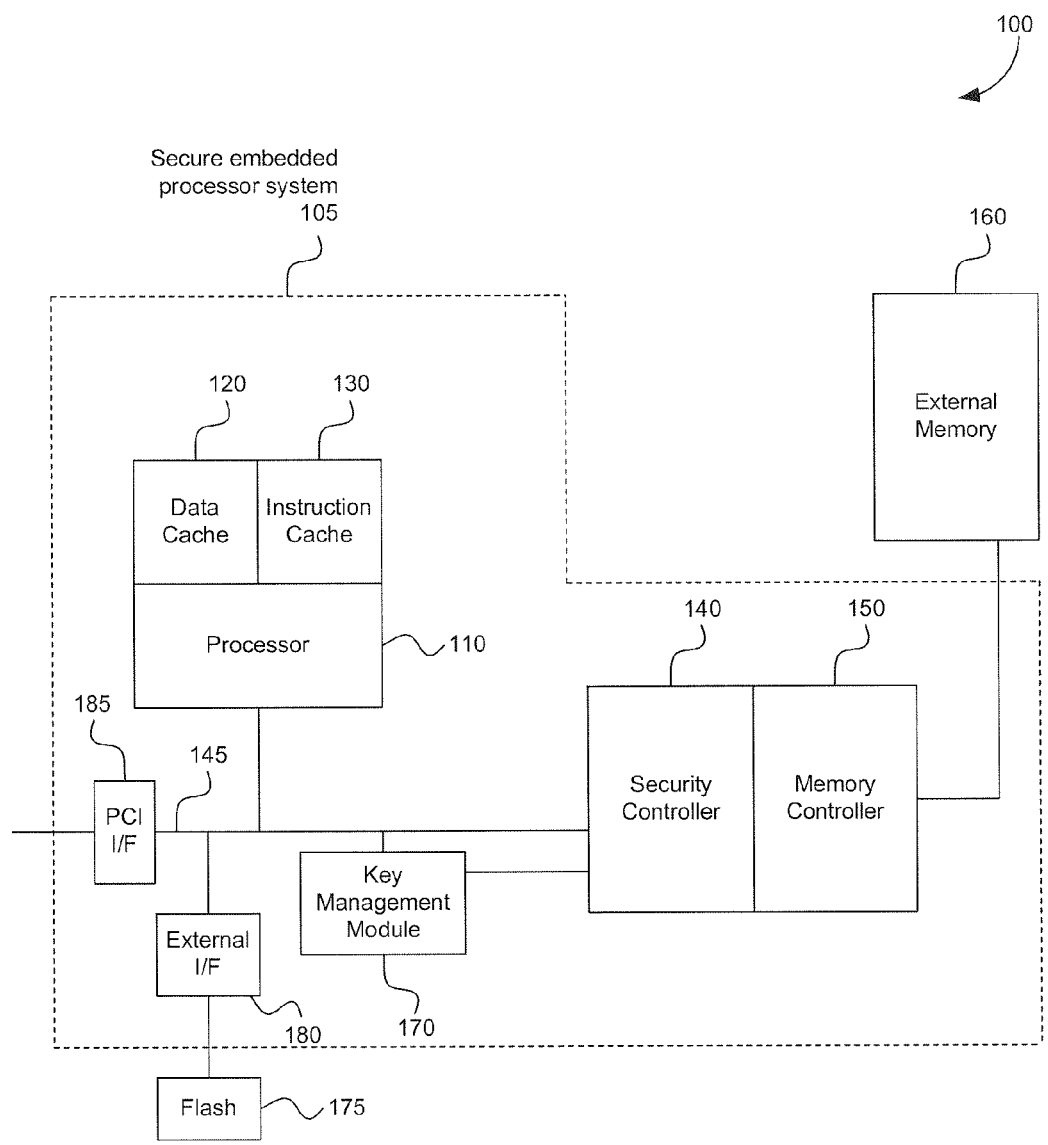
FIG. 1 is a block diagram illustrating the overall structure and context of an embodiment of the invention.

A preferred embodiment of the present invention is now described to with reference to the figures, where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of devices, systems, and applications.

I. Overview

A preferred embodiment of the present invention is now described with reference to the figures, where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of devices and applications.

II. System

The invention features a secure embedded processor system that is in communication with memory modules. An embodiment of the invention is illustrated generally in FIG. 1. A secure embedded processor system 105 is shown interfaced to an external memory module 160, and a flash memory module 175. Flash memory 175 stores executable code (known hereinafter as the image) in a compressed and encrypted form. As will be described in greater detail below, the encrypted compressed image is transferred to external memory 160 during the boot process. The image is then decrypted, decompressed, then re-encrypted for storage in external memory 160.

Instructions that are to be executed by processor 110 are fetched from external memory 160 one cache line at a time. The fetch, however, is intercepted by memory controller 150. A cache line that is fetched is then decrypted by security controller 140 before being loaded into the instruction cache 130.

Also shown in secure embedded processor system 105 is a key management module 170, which provides key management services for security controller 140. In an embodiment of the invention, an external interface 180 can also be provided to allow flash memory 175 to interface with system 105. A peripheral component interconnect (PCI) interface 185 can also be provided to allow communication with secure embedded processor system 105. PCI interface 185, external interface 180, key management module 170, security controller 140, and processor 110 are connected by an infrastructure 145, such as a bus.

Figure 2:
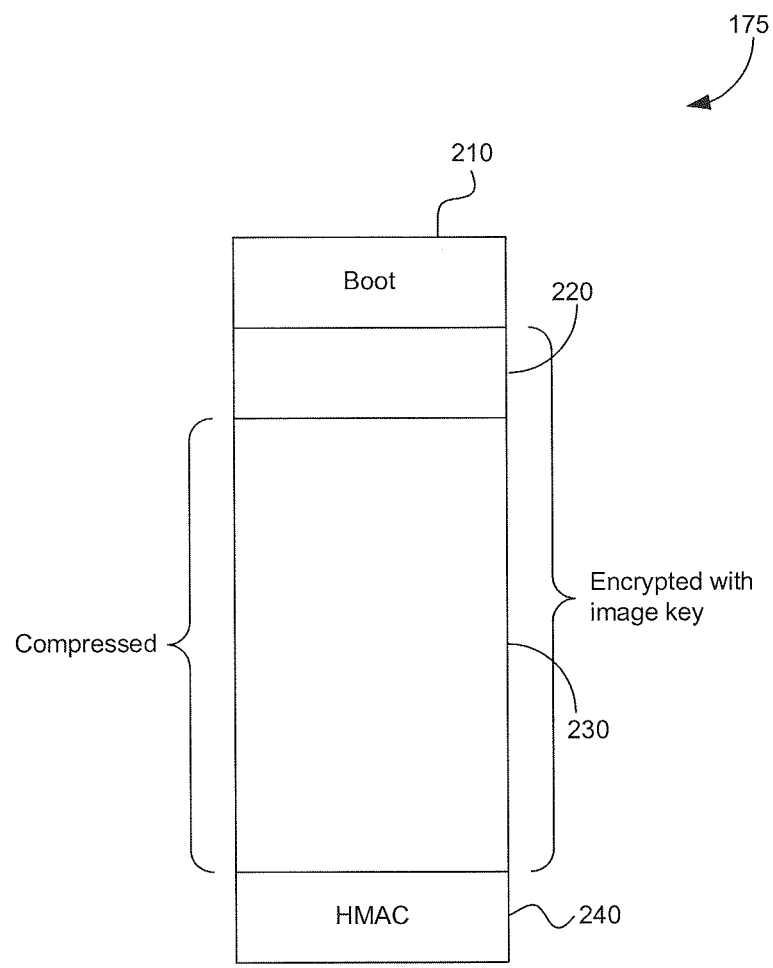
FIG. 2 illustrates executable code in encrypted and compressed form in flash memory, according to an embodiment of the invention.

Flash memory 175 is illustrated in greater detail in FIG. 2. FIG. 2 illustrates the organization of the image as it resides in flash memory 175. The image includes a segment of boot code 210. This is followed by two blocks of code 220 and 230. These two blocks are collectively encrypted with a first cryptographic key, referred to herein as an image key. In an embodiment of the invention, these code blocks are encrypted using the Triple Data Encryption Standard (3DES) algorithm. In the illustrated embodiment, code block 220 comprises logic required to decrypt the remaining block of code 230. Note that block 230 is compressed as well in the illustrated embodiment. Block 240 represents authentication data derived from blocks 210, 220, and 230. Block does not represent part of the image per se. In the illustrated embodiment, the authentication process is a hashed message authentication code (HMAC) process.

Figure 3:
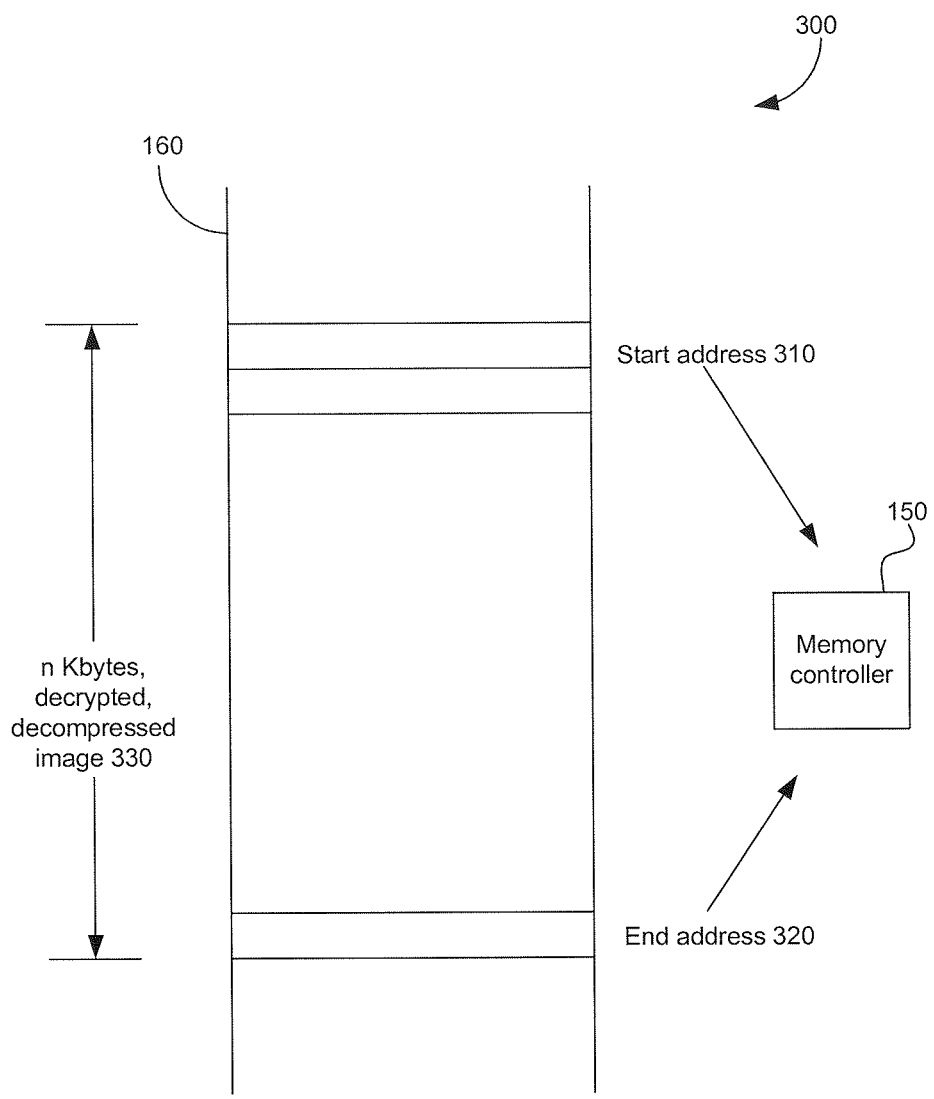
FIG. 3 illustrates external memory as it contains decrypted and decompressed executable code, according to an embodiment of the invention.

FIG. 3 illustrates the structure of the image as it resides in external memory 160 after the image has been decrypted and decompressed. The memory is shown occupying 10 KB of memory in a block 330. The starting address of this memory interval is addressed 310. The ending address for this interval is addressed 320. In an embodiment of the invention, the starting and ending addresses 310 and 320 are forwarded to memory controller 150. This serves as a security check, so that no instructions outside of these boundaries are allowed to be executed.

Figure 4:
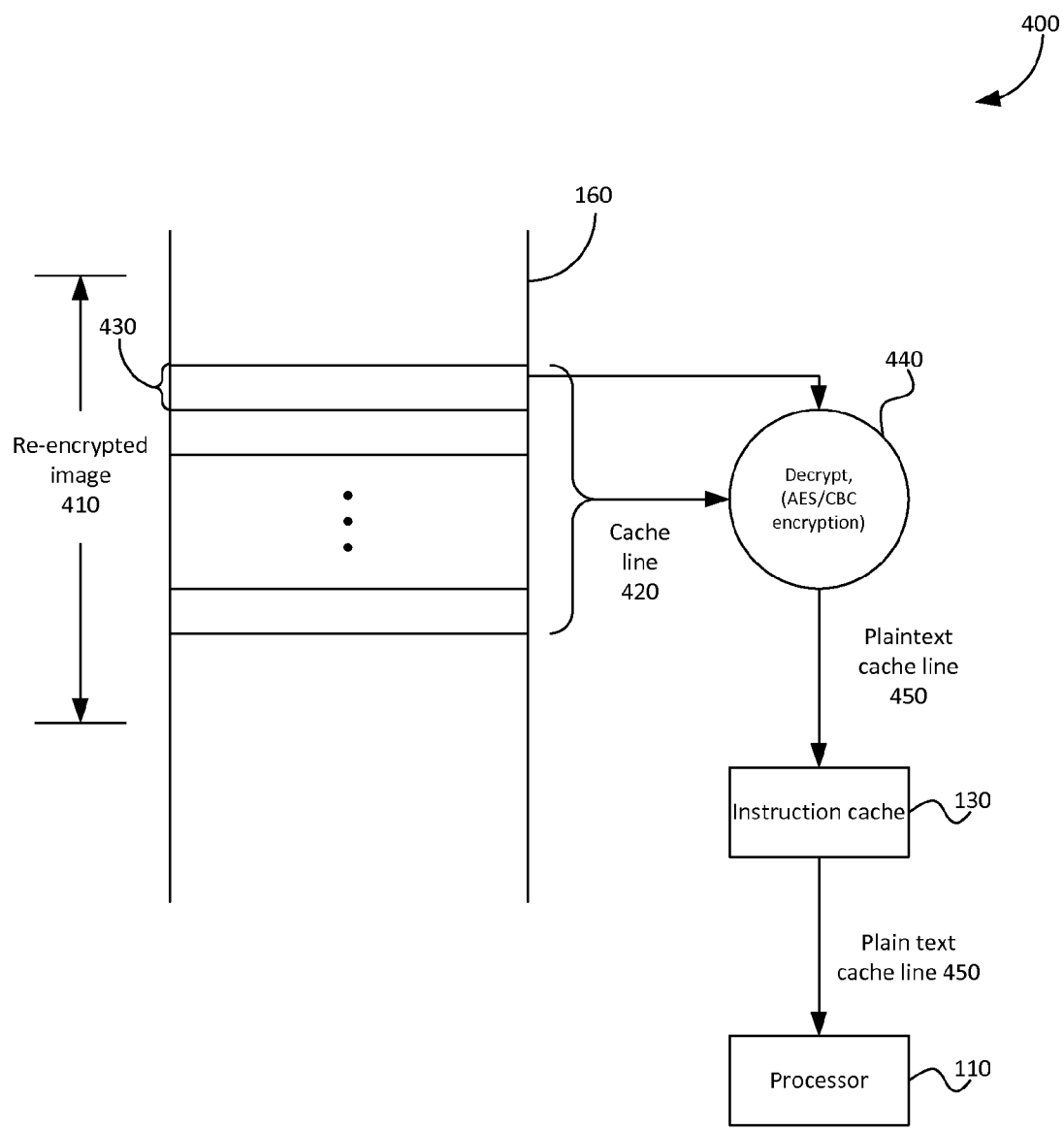
FIG. 4 illustrates the fetch process, in which a cache line of code is decrypted and forwarded to an instruction cache, according to an embodiment of the invention.

FIG. 4 illustrates the flow and processing of instructions during a fetch from external memory 160. After the image has been decrypted, the image is re-encrypted using a second key, to form a re-encrypted image 410. The re-encrypted image 410 is fetched on a cache line basis. A cache line 420 is retrieved for decryption purposes by decryption logic 440. In the illustrated embodiment, the address 430 of cache line 420 is used to initialize the decryption process. In an embodiment of the invention, the re-encryption process uses the Advanced Encryption Standard (AES) algorithm, in cipher block chaining (CBC) mode. Moreover, in an embodiment of the invention, the re-encryption process can use the AES/CBC process in the decrypt mode. Consequently, in such an embodiment the decryption process 440 actually uses the encryption mode of AES. The resulting plain text cache line 450 is then forwarded to instruction cache 130. The plain text cache line 450 is ultimately executed by processor 110.

Management and security functions related to protection of cryptographic keys are handled in part by key management module 170, shown in FIG. 1. In particular, in an embodiment of the invention, secure embedded processor system 105 receives the image key in encrypted form. The encrypted image key is decrypted by key management module 170 using a session key. The resulting plain text image key can then be used by security controller 140 as described above.

Moreover, a time constraint can be associated with an image key, so that the image key may only be used for a given duration, or only up until a particular point in time. After this point, the key can no longer be used, and is said to be expired. In an embodiment of the invention, security controller 140 can check whether the image key has expired prior to using this key. Alternatively, this check can be performed at the key management module 170.

III. Method

Figure 5:
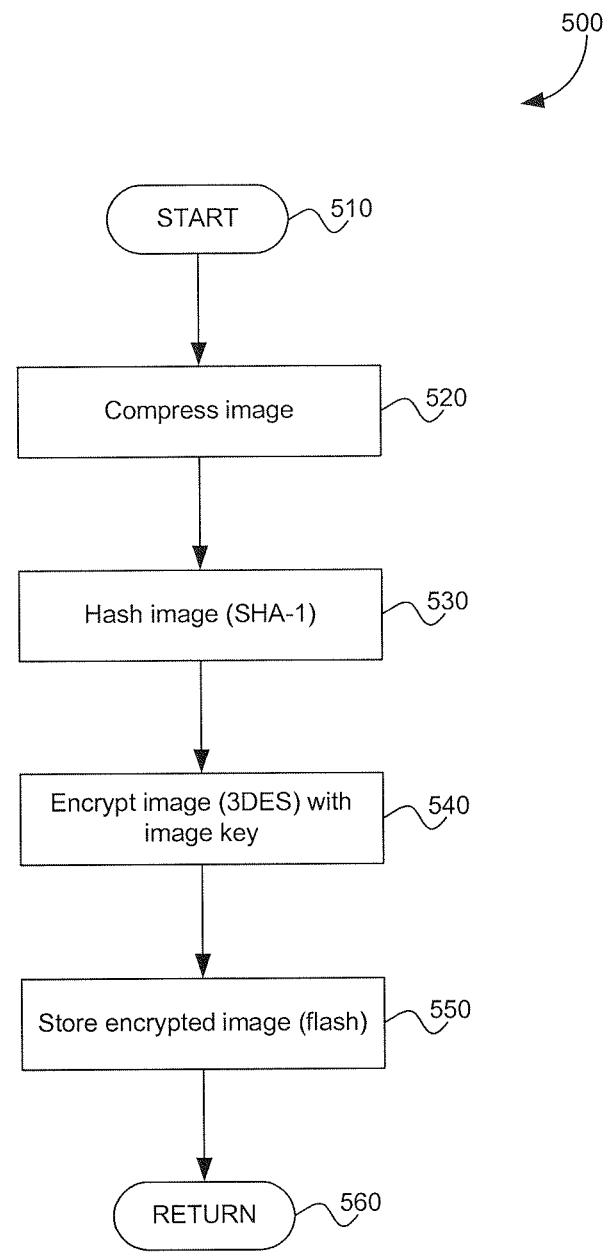
FIG. 5 is a flowchart illustrating the creation of an encrypted image, according to an embodiment of the invention.

FIG. 5 illustrates the initial compression and encryption process for the image as it is stored in the flash memory. The process begins at step 510. In step 520, the image is compressed. In step 530, the image is hashed to produce an HMAC. In an embodiment of the invention, the Secure Hash Algorithm 1 (SHA-1) is used. In step 540, the compressed image is encrypted with an image key. As mentioned above, encryption can be performed using the 3DES algorithm. In step 550, the resulting compressed encrypted image is stored in flash memory. The process concludes at step 560.

Figure 6:
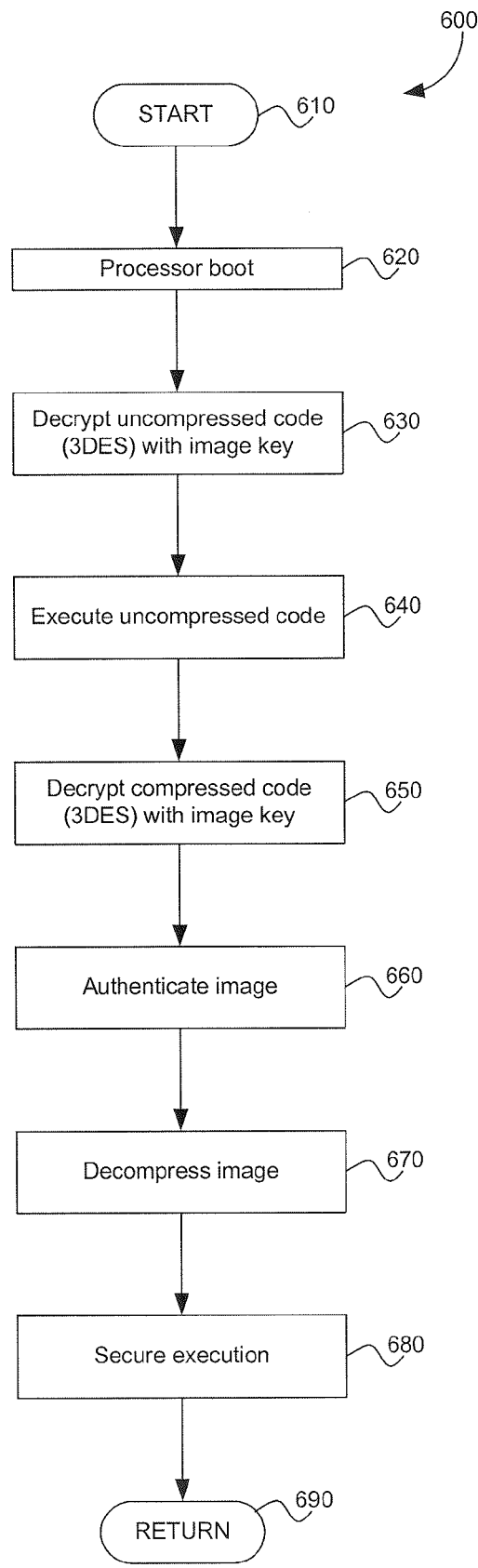
FIG. 6 is a flowchart illustrating the overall process of accessing and using the encrypted image, according to an embodiment of the invention.

The overall process of securely accessing and executing the image is illustrated in FIG. 6. The process begins at step 610. In step 620, the processor undergoes its boot operation. In step 630, the portion of the image that is uncompressed is decrypted using the image key. In step 640, this uncompressed code is executed. The logic in the uncompressed code portion of the code serves to decrypt the remaining image. In step 650, the remaining portion of the image is decrypted with the image key. In step 660, the image is authenticated. As described above, authentication can take place using the SHA-1 algorithm. In step 670, the image is decompressed. In step 680, secure execution can now take place. The process concludes at step 690.

Figure 7:
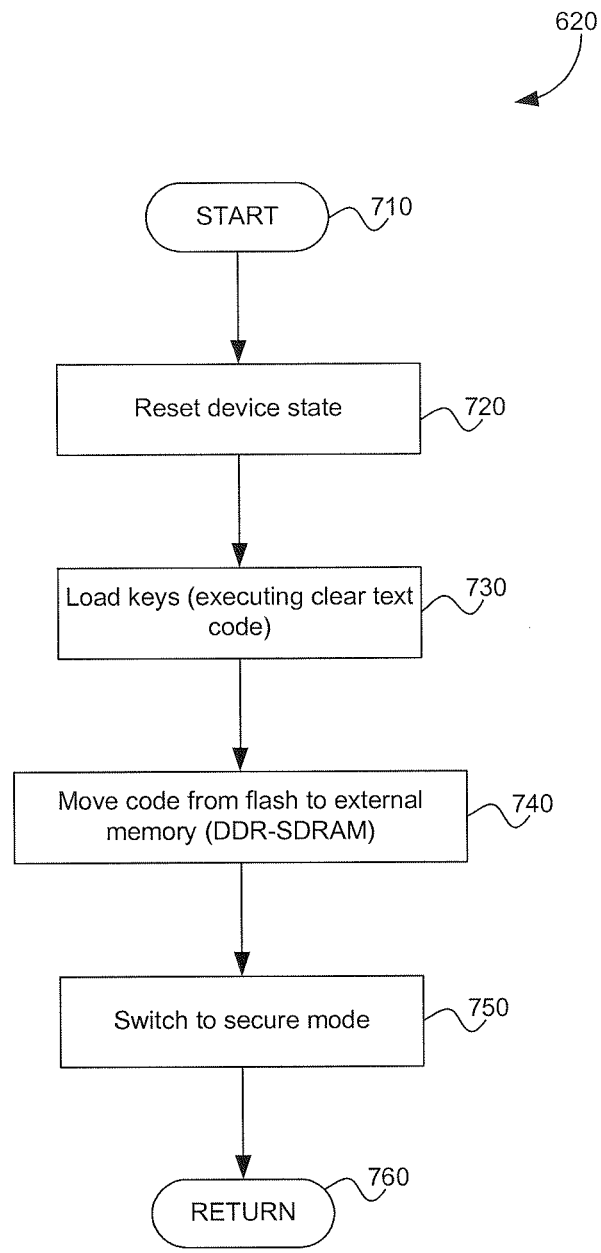
FIG. 7 is a flowchart illustrating the processor boot process in greater detail, according to an embodiment of the invention.

The step of booting the processor (step 620 of FIG. 6) is illustrated in greater detail in FIG. 7. The process begins at step 710. In step 720, the device state is reset. In step 730, cryptographic keys are loaded for purposes of subsequent cryptographic processing. In step 740, the image is moved from flash memory to external memory. In an embodiment of the invention, the external memory can be implemented using double data rate synchronous dynamic random access memory (DDR SDRAM). In step 750, the system is switched to secure mode. The process concludes at step 760.

Figure 8:
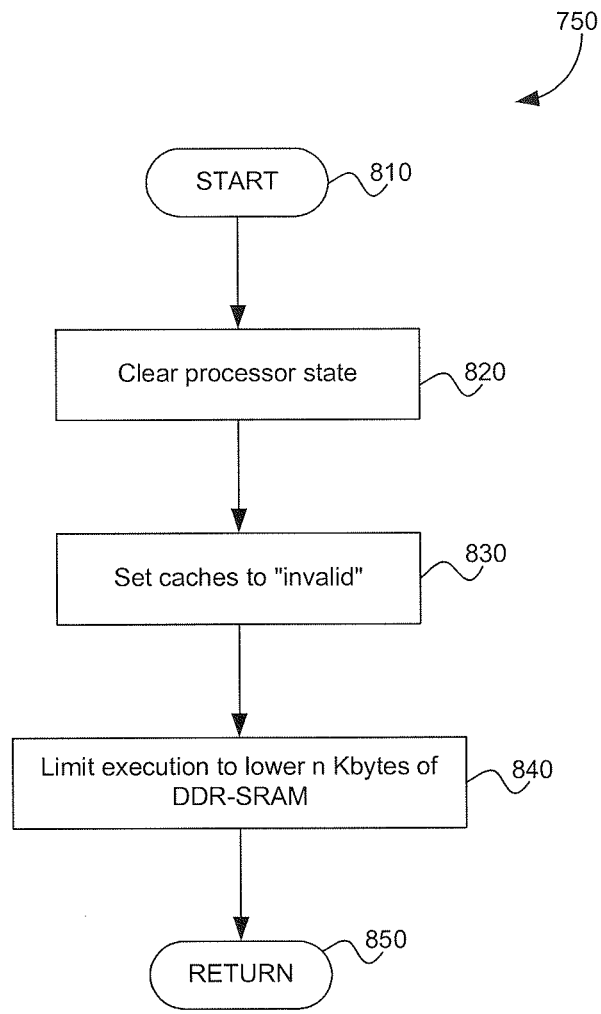
FIG. 8 is a flowchart illustrating the process of switching to a secure mode, according to an embodiment of the invention.

The process of switching to a secure mode (step 750 of FIG. 7) is illustrated in greater detail in FIG. 8. The process begins at step 810. In step 820, the processor state is cleared. In step 830, the instruction and data caches associated with a processor are set to the invalid state. This prevents any information that happens to be residing in these caches from being used by the processor for execution. In step 840, the upper and lower address boundaries of the image are forwarded to the memory controller, thereby limiting execution to the lower n kilobytes of DDR-SRAM. The process concludes at step 850.

Figure 9:
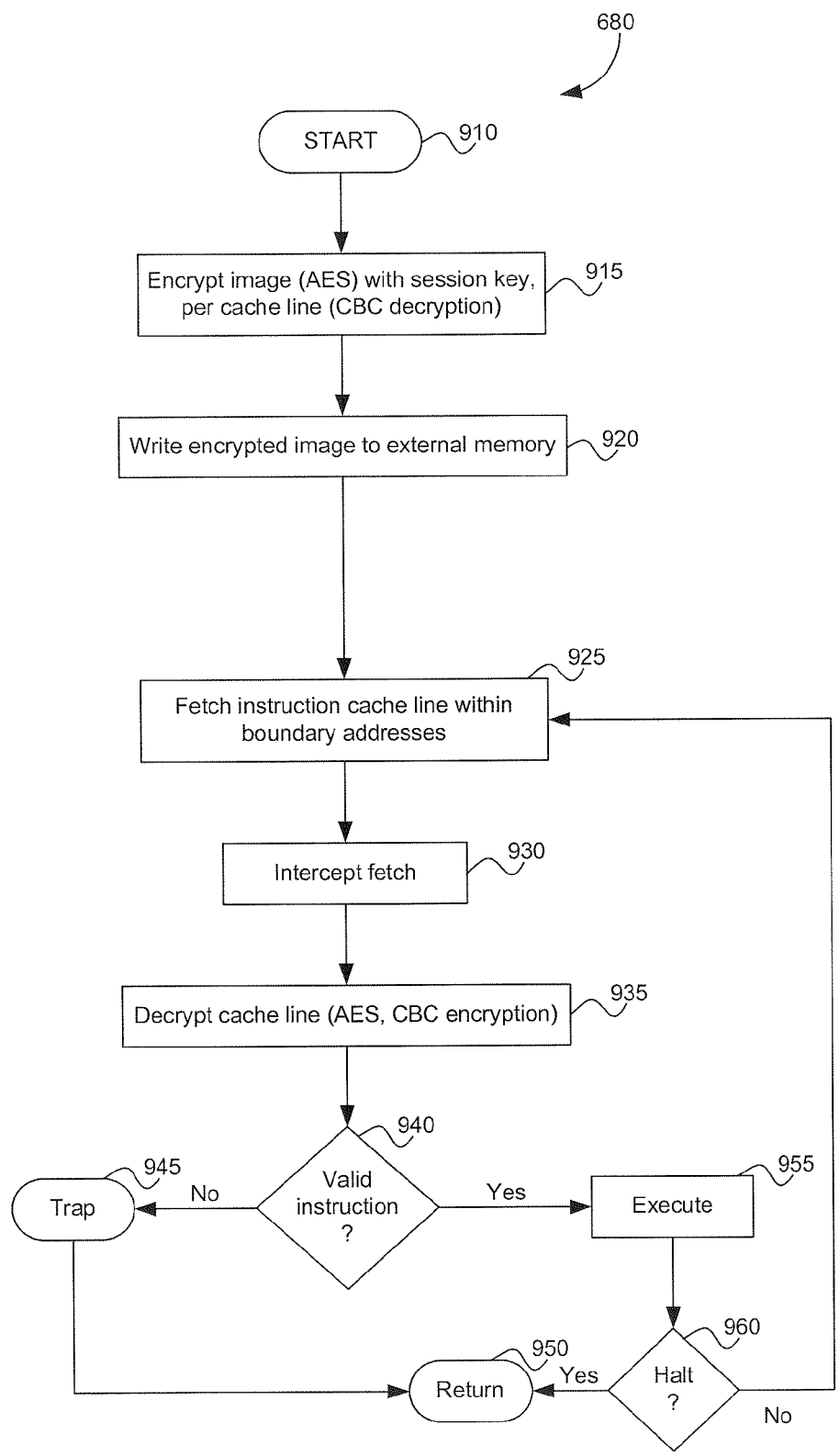
FIG. 9 is a flowchart illustrating the process of secure execution, according to an embodiment of the invention, according to an embodiment of the invention.

The secure execution step (step 680 of FIG. 6) is illustrated in greater detail in FIG. 9. The process begins at step 910. In step 915, the image is encrypted with a session key on a per cache line basis. In an embodiment of the invention, the AES algorithm is used for this step in the CBC mode. Moreover, AES can be used in its decryption configuration for this encryption process. This allows for error correction throughout the image encryption process. In step 920, the encrypted image is written to external memory. In step 925, an instruction cache line is fetched, wherein the cache line is taken from within the boundary addresses. In step 930, the fetch is intercepted by the memory controller. In step 935, the cache line is decrypted by the security controller. If the encryption process used the AES/CBC algorithm in decryption mode, then the decryption step 935 will actually use the encryption mode of AES/CBC. After decryption of the cache line in step 935, a determination is made in step 940 as to whether the resulting instruction is valid. If not, then the instruction is trapped in step 945. Otherwise, the instruction is ready for execution in step 955. In step 960, a determination is made as to whether there are additional instructions to be fetched and executed, or whether the process is to halt. If the process halts, then the process concludes at step 950. Otherwise, the process returns to step 925, where an additional cache line is fetched.

Figure 10:
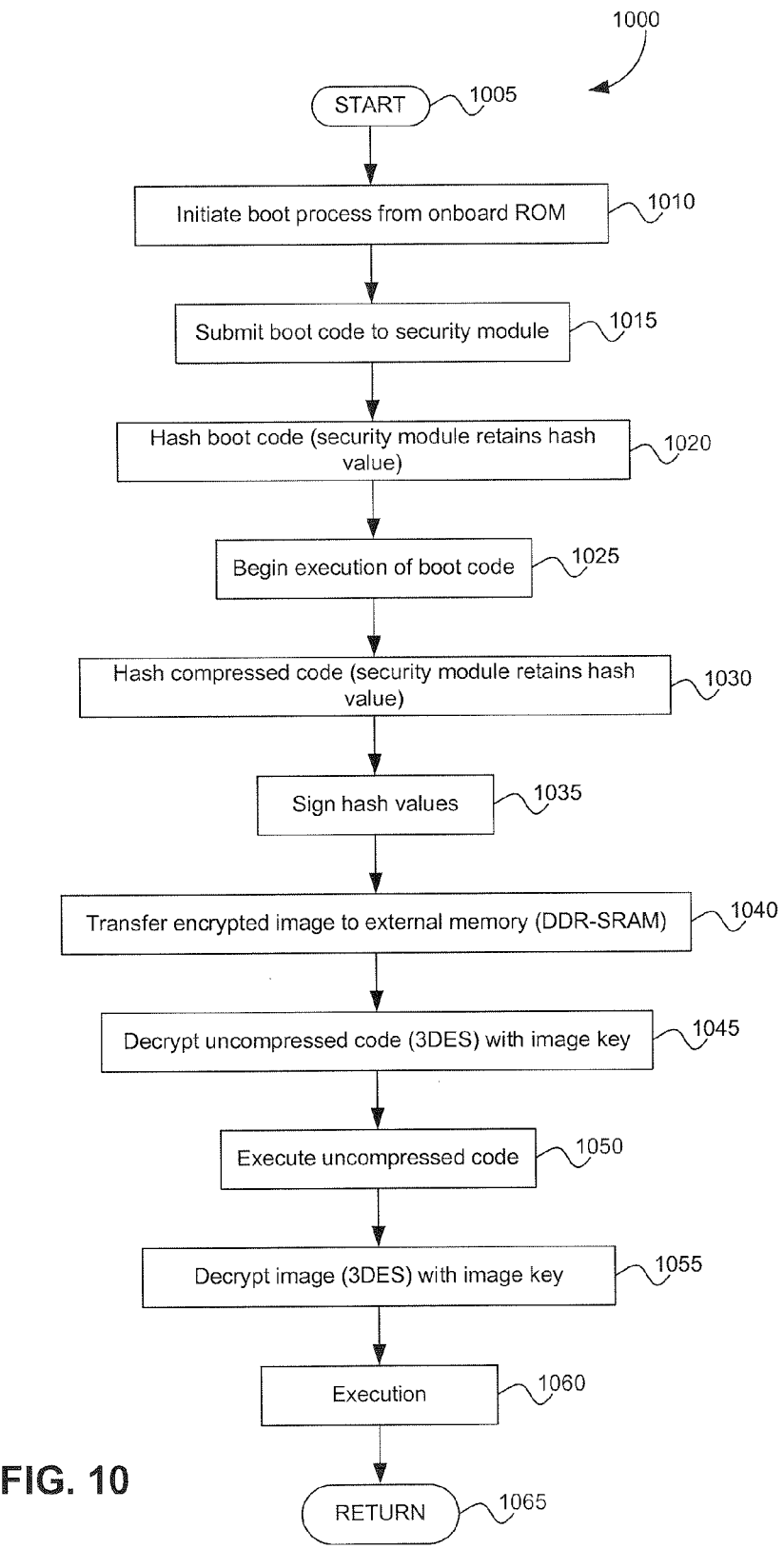
FIG. 10 is a flowchart illustrating a simplified version of the process of the invention, according to an embodiment of the invention.

An alternative method of the invention is illustrated in FIG. 10. The process begins at step 1005. In step 1010, the boot process is initiated from on-board read only memory (ROM). In step 1015, the boot code is submitted to the security module. In step 1020, the boot code is hashed. The security module retains the hash value during this step. In step 1025, execution of the boot code is commenced. In step 1030, the compressed code is hashed, such that the security module retains the resulting cache value. In step 1035, the hash value is signed. In step 1040, the encrypted image is transferred to external memory. As mentioned above, in an embodiment of the invention, external memory can be implemented as DDR-SRAM. In step 1045, the uncompressed code is decrypted with the image key. In step 1050, the uncompressed code is executed. In step 1055, the remaining image is decrypted with the image key. In step 1060, the remaining image is decrypted as necessary. The process concludes at step 1065.

IV. Conclusion

While various embodiments of the present invention have been described above, it should be understood that they have been presented by way of example, and not limitation. It would be apparent to persons skilled in the relevant art that various changes and detail can be made therein without departing from the spirit and scope of the invention. Thus the present invention should not be limited by any of the above described exemplary embodiments.

What is claimed is:

1. A system for secure execution of processor instructions, the system comprising:
    a first memory configured to store an encrypted instruction; and
    a secure processor system coupled to said first memory and configured to receive the encrypted instruction, said secure processor system comprising:
       a processor, and
       a security controller configured to decrypt said encrypted instruction according to a decryption algorithm, wherein the decryption algorithm uses a first key as a key input to the decryption algorithm and an address corresponding to a location in said first memory of said encrypted instruction as an initialization vector input to the decryption algorithm.

2. The system of claim 1, wherein the secure processor system further comprises:
    an instruction cache coupled to said processor; and
    a memory controller coupled to said instruction cache configured to fetch said encrypted instruction from said first memory.

3. The system of claim 2, wherein the security controller is further configured to:
    load said decrypted instruction into said instruction cache to be executed by said processor.

4. The system of claim 3, wherein the secure processor system further comprises:
    a cryptographic engine configured to use an advanced encryption standard (AES) algorithm.

5. The system of claim 4, wherein said cryptographic engine is further configured to use an encryption cipher block chaining (CBC) mode of said AES algorithm to decrypt said encrypted instruction.

6. The system of claim 1, wherein the secure processor system is further configured to receive an image having a block of encrypted executable code and an encrypted block of data.

7. The system of claim 6, wherein the security controller is further configured to:
    decrypt, using a second key, said block of encrypted executable code to obtain executable code,
    decrypt said encrypted block of data by executing said executable code, wherein said encrypted block of data includes a plurality of instructions,
    encrypt an instruction in said plurality of instructions using the first key, and
    store said encrypted instruction in said first memory.

8. The system of claim 7, wherein the security controller is further configured to encrypt said instruction using an advanced encryption standard (AES) algorithm in decryption mode.

9. The system of claim 6, further comprising a second memory configured to store the image having the block of encrypted executable code and the encrypted block of data.

10. The system of claim 9, wherein the second memory is flash memory.

11. The system of claim 10, wherein said flash memory stores said image in a compressed form; and
    said image is decompressed when transferred to the first memory during a boot process.

12. The system of claim 1, wherein a time constraint can be associated with the first key.

13. A method, in a secure processor system, for secure execution of processor instructions, comprising:
    intercepting, by a memory controller in the secure processor system, a request for an instruction to be executed by a processor;
    retrieving an encrypted instruction, corresponding to the instruction, from a first memory;
    decrypting, in a security controller in the secure processor system, the encrypted instruction using an encryption mode of an advanced encryption standard (AES) algorithm to obtain a resulting instruction, wherein a first key is used as a key for the AES algorithm and an address, corresponding to a location in the first memory of the encrypted instruction is used as an initialization vector input for the AES algorithm; and
    loading the resulting instruction into an instruction cache in the secure processor system, wherein the resulting instruction is to be executed by the processor.

14. The method of claim 13, further comprising:
    prior to retrieving the encrypted instruction,
    receiving, in the secure processor system, an image having a block of encrypted executable code and an encrypted block of data;
    decrypting, in the security controller, the block of encrypted executable code to obtain first executable code using a second key;
    decrypting the encrypted block of data, in the security controller, by executing the first executable code, wherein the block of data includes second executable code having a plurality of instructions; and
    encrypting an instruction in the plurality of instructions using the first key.

15. The method of claim 14, further comprising:

storing the encrypted instruction in the first memory.

16. The method of claim 15, further comprising:

individually encrypting remaining instructions in the plurality of instructions using the first key; and storing the remaining encrypted instructions in the first memory.

17. The method of claim 14, wherein encrypting the instruction further comprising:

encrypting the instruction using the AES algorithm.

18. The method of claim 14, wherein the image further comprises a segment of boot code, the method further comprising:

receiving, in the secure processor system, the segment of boot code; and booting the processor using the segment of boot code.

19. The method of claim 13, wherein retrieving the encrypted instruction comprises:

retrieving the encrypted instruction from an allowable address space with the first memory.

\* \* \* \* \*